United States Patent
McKechnie

[15] 3,699,248
[45] Oct. 17, 1972

[54] AUTOMATIC AREA OF INTEREST TELEVISION OPTICAL PROBE FOCUS APPARATUS

[72] Inventor: John C. McKechnie, Maitland, Fla.

[73] Assignee: The United States of America as represented by the Secretary of the Navy

[22] Filed: Jan. 10, 1972

[21] Appl. No.: 216,676

Related U.S. Application Data

[63] Continuation of Ser. No. 184,132, Sept. 27, 1971.

[52] U.S. Cl............178/6.8, 178/7.92, 178/DIG. 29, 178/7.2
[51] Int. Cl..............................................H04n 5/34
[58] Field of Search..178/7.1, 7.2, 7.92, 6.8, DIG. 29

[56] References Cited

UNITED STATES PATENTS 3,617,633  11/1971  Barr et al............178/DIG. 29
3,621,136  11/1971  Stanwood............178/DIG. 29

Primary Examiner—Robert L. Richardson
Attorney—Richard S. Sciascia et al.

[57] ABSTRACT

An automatic focusing apparatus for a television optical probe system wherein an automatic focus system normally responsive to output signals of a video camera to focus its lens system on a scene is held in inhibited condition by a normally closed electronic switch interrupting the passage of video electrical signals from said camera to said automatic focus system, and wherein a monitor screen is positioned for observation by a viewer and a sensor system responsive to head movement of the viewer is provided to produce electrical signals to gate the electronic switch to "on" condition to thereby provide lens focusing of said camera only during that portion of the video scan corresponding to a limited area of the monitor on which the trainee viewer's eyes are focused.

7 Claims, 5 Drawing Figures

AUTOMATIC AREA OF INTEREST TELEVISION OPTICAL PROBE FOCUS APPARATUS

CROSS REFERENCE TO RELATED APPLICATION

This application is a continuation of U. S. application Ser. No. 184,132 filed Sept. 27, 1971 under title "Automatic Optical Probe Focus Device" by inventor, John C. McKechnie.

BACKGROUND OF THE INVENTION

This invention relates to the field of optics and in particular to automatic focusing means for optical systems including, for example, generalized optical probes, T.V. optical probe, and T.V. cameras.

In the prior art, focusing of such devices has been obtained by manual means in one instance and by methods for automatic adjustment for a given set of data and equipment based upon empirical formula developed from prior knowledge and measurements of the object plane distance and necessary best point of focus object distance.

In the parent U.S. application Ser. No. 184,132, filed Sept. 27, 1971, there was disclosed and claimed automatic focusing apparatus based upon the phenomenon that maximum frequency of video signal above a selected gray level signal output is determinative of the precise point of the lens focus for the subject distance.

The subject application utilizes the above mentioned teachings and provides additional circuitry to obtain a limited area of interest focus corresponding to the position of the head of a viewer of a monitor screen of the scene viewed by the T.V. camera such that as the viewer looks at a particular limited area of the scene the apparatus automatically provides best lens focus of the T.V. camera for that specific limited area of the overall scene.

SUMMARY OF THE INVENTION

The subject invention is directed to an improvement in automatic focusing for optical probes wherein the automatic focusing is made effective only for a portion of the scene viewed corresponding to that portion of the scene to which the line of sight of a viewer are directed. In one aspect of the invention, sensor means comprising electro-optical apparatus is provided to produce a spot on a screen corresponding to the area of interest under observer view and a T.V. camera coordinated in scan with the scan of the scene camera is employed to respond to actuate, i.e., gate, an electronic switch to "on" condition to actuate the automatic focusing means only for the limited area of interest as determined by the horizontal and vertical axis orientation of the viewer's head. In a second aspect of the invention, the sensor means provided comprises potentiometer means responsive to $x$–$y$ axis of head movement of the viewer and an electronic circuit for developing from the potentiometer means outputs the necessary electrical signals to gate the electronic switch means to "on" condition for actuating the automatic focus system.

DESCRIPTION OF THE PREFERRED EMBODIMENTS

Figure 1:
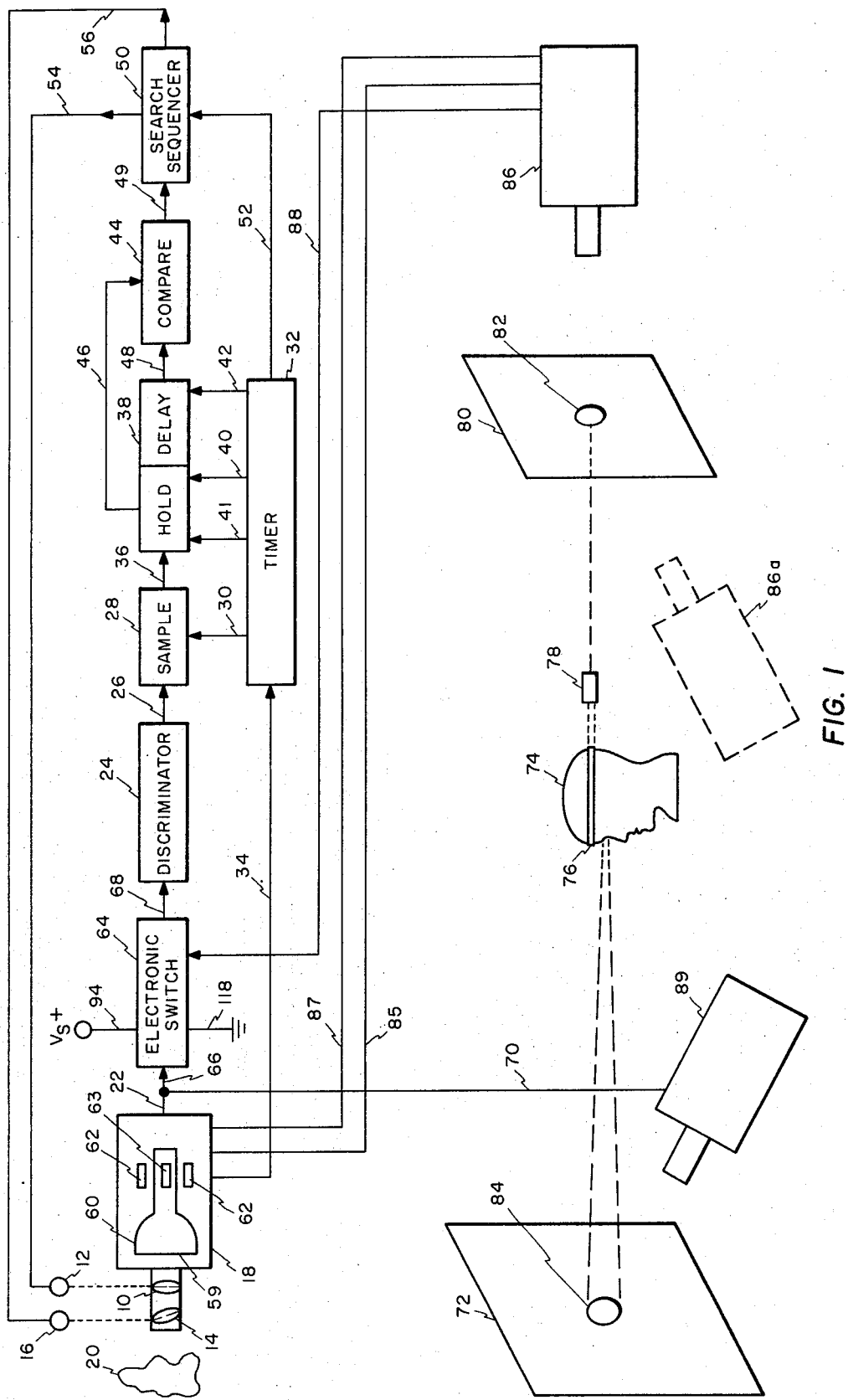
FIG. 1 is a diagrammatic view of an area of interest automatic T.V. optical probe apparatus utilizing an electro-optical sensor means and incorporating the invention.

Referring to FIG. 1, the apparatus shown therein includes an arrangement of elements whereby a lens system of an optical probe is adjusted by apparatus in which amplitude voltage signals representative of image plane spatial frequency response are developed from video input signals and successive samples are obtained and compared to provide actuating signals for adjustment of the lens system. This automatic focus system arrangement is fully described in my U.S. application Ser. No. 184,132 filed Sept. 27, 1971, under title "Automatic Optical Probe Focus Device."

The automatic focus system mentioned above responds to the video output of a T.V. camera 18 to adjust a linearly moveable lens 10 thereof and an angularly adjustable lens 14 thereby to provide automatic focus on an image 20 by controlled operation of sensor motors 12 and 16 connected respectively to the lenses 10 and 14. More particularly, the video output signals are passed to a discriminator 24 which develops an output signal of amplitude dependent upon the frequency of the video input signal. Successive samples of the output of discriminator 24 are received on line 26 by a sample circuit 28 upon command of a timer 32 via sample actuating line 30. The successive samples are passed to a hold and delay circuit 38 which accepts a sample signal in the hold portion thereof and thereafter moves that sample to the delay portion of circuit 38 and accepts a succeeding sample in the hold portion thereof. The shift from hold to delay is actuated from the timer by a shift signal on line 40. The two successive signals in hold and delay of 38 are then compared in a compare circuit 44 via input line 48 and the output on line 49 is passed to a search sequencer 50. The signal on line 49 is positive or negative dependent upon the relative polarity of the signals in the hold and delay positions of circuit 38. The search sequencer 50 is programmed from timer 32 via search line 52 and successively adjusts lens 10 via line 54 and servo motor 12 and lens 14 via line 56 and servo motor 16. A positive output signal from searcher 50 advances the servo in one direction and a negative signal actuates the servo in the opposite direction until the proper focus for each lens is obtained. Line 42 from timer 32 provides a dump signal for the delay portion of circuit 38 to clear the delay portion for transfer of a sample signal from hold to delay. Line 41 from timer 32 to the hold portion of circuit 38 clears the hold circuit. The timer 32 is actuated on line 34 from the vertical sync 62 of the camera 18. The cathode ray tube is indicated at 60 with its face at 59, and 63 indicates the horizontal deflection coil.

The foregoing is given for understanding of the subject invention. In the subject invention the video output of the T.V. camera 18 is not passed directly to the discriminator as in the circuit described above but is passed through a normally "off" electronic switch means 64 via lines 22, 66, and 68 as indicated. The object in the subject invention is to pass video signals through the automatic focusing circuit only for that portion of the raster scan which represents a limited area of interest to which the viewer's attention is directed, to thereby promote automatic focus only upon a specific limited area of the overall scene and, for other portions of the scan, to inhibit automatic focus, thereby providing best focus for that limited area of interest.

To accomplish this end there is provided, as shown in FIG. 1, a T.V. projector 89 connected to video output line 22 by a line 70 to project on a screen 72 the scene 20 as viewed by T.V. camera 18. Further, attached to the head of a viewer 74 by a headpiece or band 76 or other suitable device is a light source 78 for projecting on a screen 80 a light pattern 82 corresponding to an area of interest 84 (on screen 72) on which the sight of the viewer is directed. As the head of the viewer is rotated or tilted to look at another portion of the screen 72, the position of the light pattern 82 is varied responsive to movement of the viewer's head in inverted relation. Viewing the screen 80 is provided a second T.V. camera 86 synchronized to scan in unison with the first camera 18. Thus, lines 85 and 87 carry the horizontal and vertical sync signals from camera 18 to camera 86. However, when the light source 78 and the camera 86 are positioned on opposite sides of the screen 80, camera 86 is either mounted upside down or an inverter lens is employed to compensate for the inverse movement relationship of the spots 84 and 82. If the camera 86 were positioned on the same side of the screen, as shown in dotted line at 86a, then inversion of the camera or use of an inverter lens is not required. Also, when the camera and light source are on opposite sides of the screen the screen should be translucent so that the light spot will shine through. The output of camera 86 is connected by a line 88 to the electronic switch 64 to gate the switch to "on" condition only when the camera is scanning light pattern 82 and thereby provide automatic focusing only for this limited area corresponding to the limited area of interest 84 as viewed by the viewer.

Figure 2:
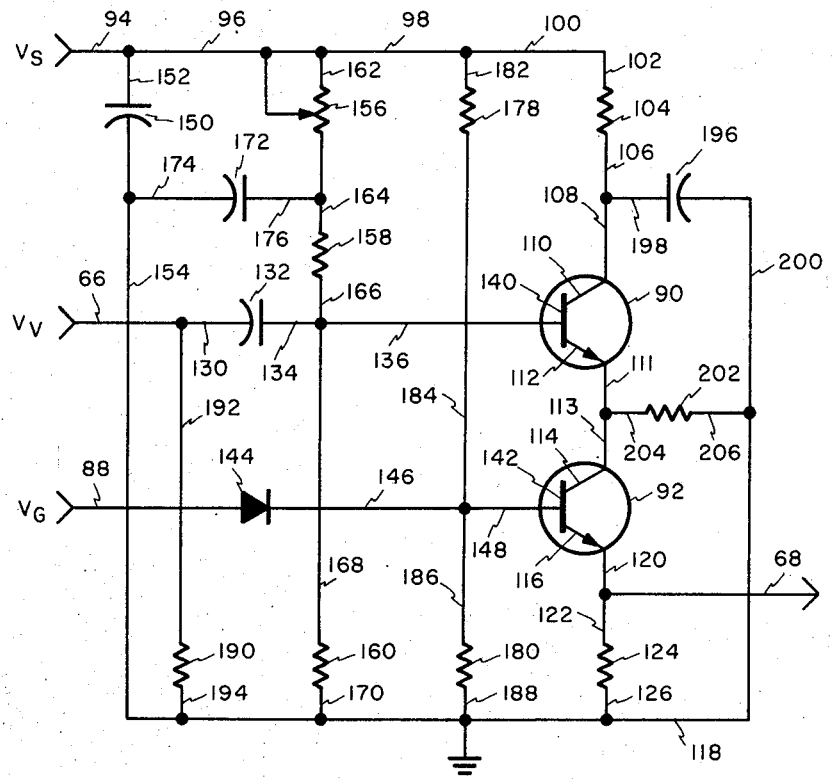
FIG. 2 is a detailed electronic circuit of a switch device incorporated in the apparatus of FIG. 1.

Referring to FIG. 2, there is shown in detail one suitable circuit for the electronic switch 64 of FIG. 1. In the circuit of FIG. 2, two NPN transistors 90 and 92 are connected in series between a voltage supply $V_s$ and a ground indicated. Lines 94, 96, 98, 100, and 102, balancing resistor 104, and lines 106 and 108 connected between $V_s$ and a collector 110 of transistor 90. The emitter 112 of transistor 90 is connected to a collector 114 of transistor 92 via lines 111 and 113 and an emitter 116 of transistor 92 is connected to a common grounded line 118 via lines 120, 122, balancing resistor 124 and a line 126.

Transistor 90 is gated from a video voltage source $V_v$ which is the camera 18 of FIG. 1, via lines 66, 130, a capacitor 132 and lines 134 and 136 connecting to a base 140 of transistor 90. Transistor 90 operates in the mode of an emitter follower responsive to the video signal from the $V_v$ source. A base 142 of transistor 92 is gated to "on" condition from a gate voltage source $V_g$ which in FIG. 1 is the camera 86 via line 88, a diode 144 and lines 146 and 148.

Balancing of the circuit and noise suppression are provided by a potentiometer and several resistors and capacitors including the following. A capacitor 150 connected between line 94 and ground line 118 via lines 152 and 154. A potentiometer 156 and resistors 158 and 160 connected between lines 96 and ground line 118 via lines 162, 164, 166, 168 and 170, line 166 being connected to line 136 as indicated. A capacitor 172 connected between lines 154 and 164 via lines 174 and 176. Resistors 178 and 180 connected in series between lines 98 and grounded line 118 via lines 182, 184, 186 and 188, line 184 being connected to line 148 as indicated. And a resistor 190 connected between line 66 and grounded line 118 via lines 192 and 194. The output of the switch circuit is carried on a line 68 connected to the emitter 116 of transistor 92 and delivering its output to the discriminator 24 of FIG. 1. Further balancing elements include a capacitor 196 connected between line 108 and grounded line 118 via lines 198 and 200 and a resistor 202 connected between line 113 and grounded line 118 via lines 204 and 206.

In operation the video signals from camera 18 (FIG. 1) pass from video output line 66 (FIGS. 1 and 2) through transistor 90 to the switch circuit output line 68 when transistor 92 is gated to "on" condition. The period of "on" condition of transistor 92 is limited to the area of interest portion of the scan of the scene by the output signals from camera 86 on line 88 responsive to the position of the head of the viewer which in turn denotes the pattern 82 on the screen 80 which is monitored by camera 86.

Figure 3:
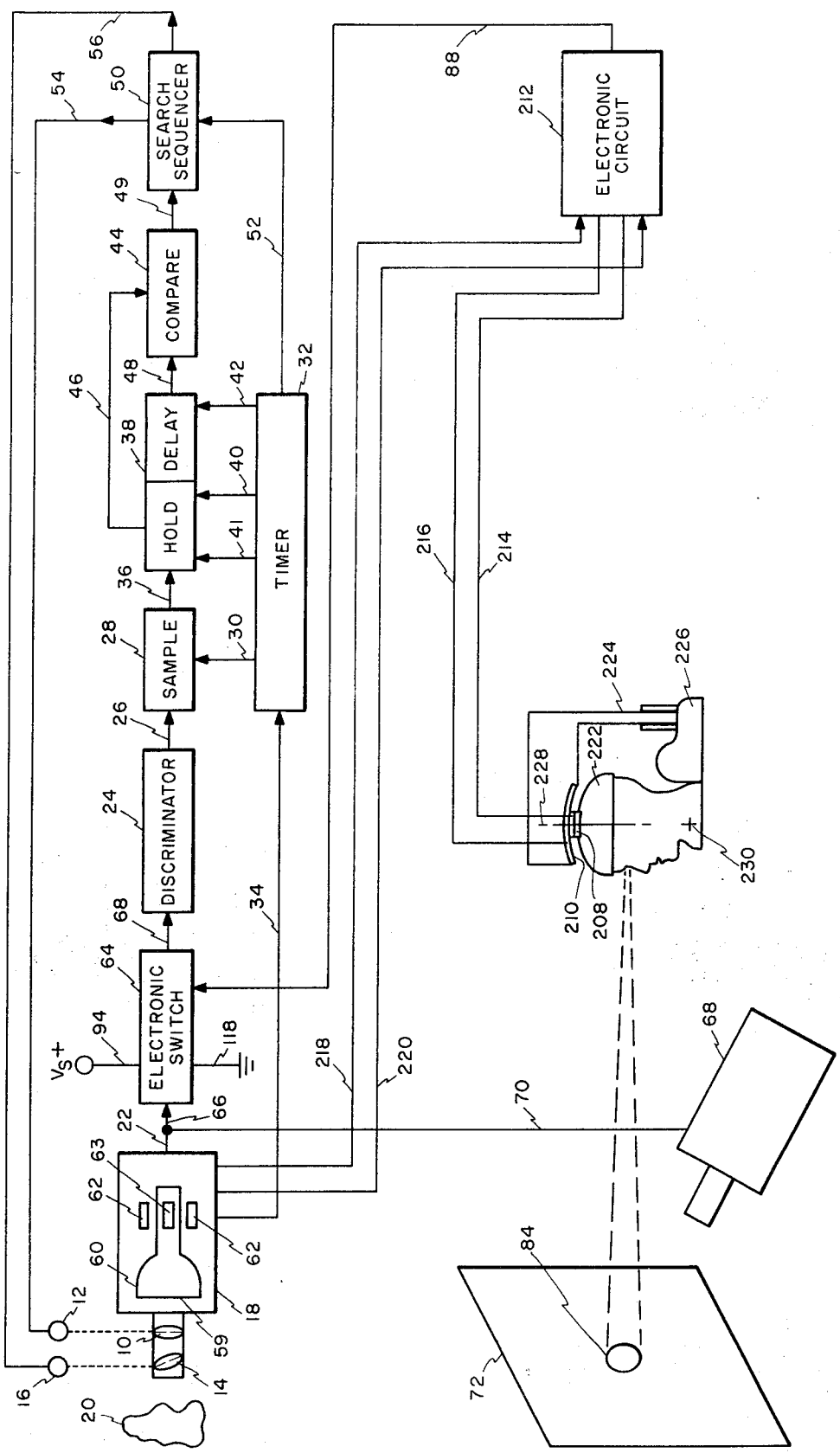
FIG. 3 is a diagrammatic view of a modification of the apparatus of FIG. 1 utilizing a modified electrical sensor means of potentiometer type and incorporating the invention.
Figure 4:
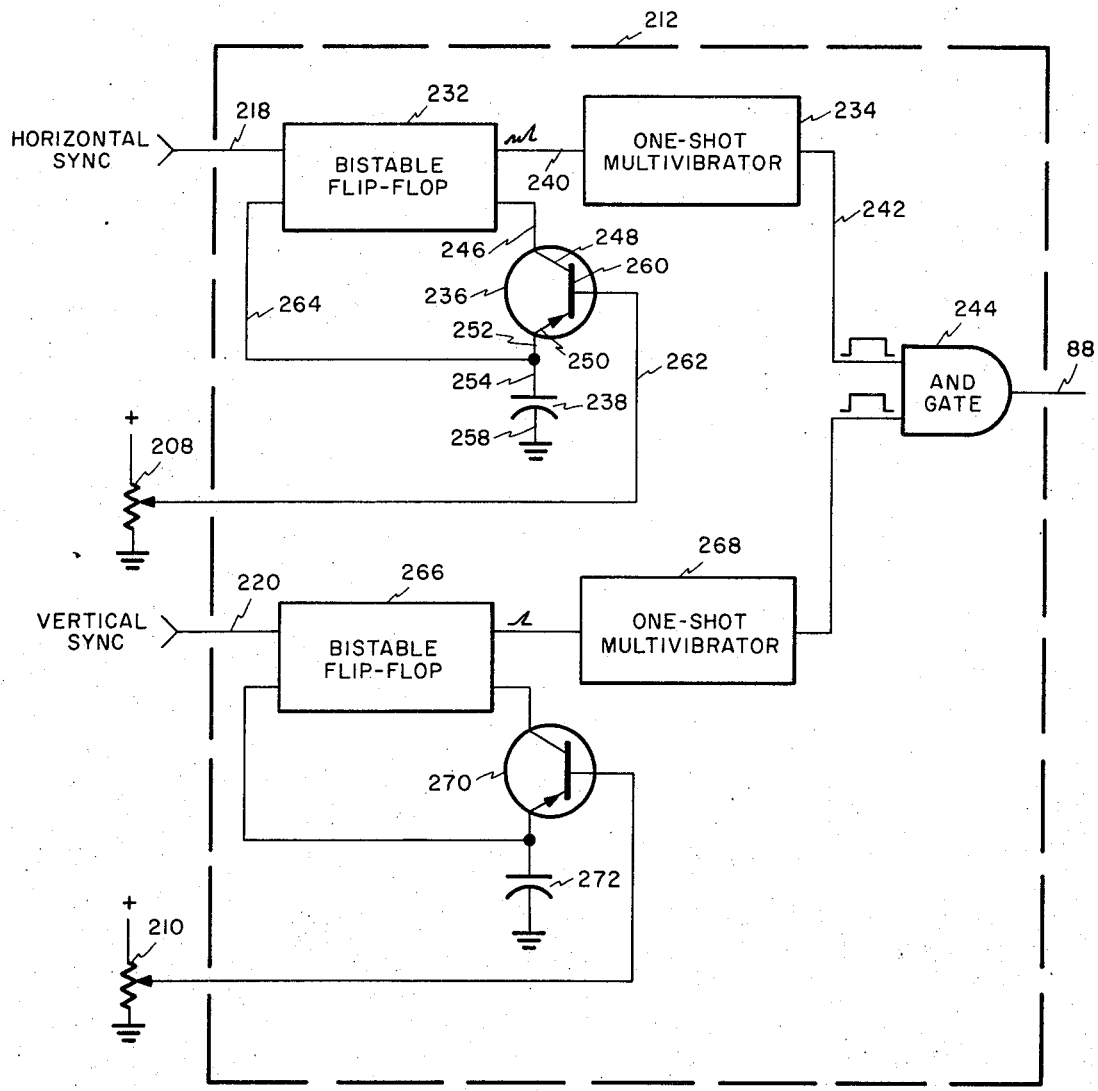
FIG. 4 is a detailed electronic circuit used in the sensor of the apparatus of FIG. 3.

Applying the same basic principal of automatic focus on a limited area of interest responsive to the position of the head of the viewer but with a view to eliminating the cost of the monitor camera 86 and its associated screen 80, there is provided in a second aspect of the invention the apparatus as shown in FIGS. 3 and 4.

In FIG. 3 the gate signals on line 88 for the switch 64 are provided by mechanically operated potentiometer units 208 and 210 responsive respectively to turn and tilt movement of the viewer's head and an electronic circuit 212 which responds to the potentiometer output signals and to horizontal and vertical T.V. raster sync inputs to gate the electronic switch 64 for time periods corresponding to the limited view area toward which the viewer's attention is directed. Potentiometers 208 and 210 are connected to provide inputs to circuit 212 on respective lines 214 and 216. Horizontal and vertical sync inputs are provided from camera 18 on respective lines 218 and 220. Potentiometers 208 and 210 are fixed by fastenings or other suitable means to a head piece 222 worn by the viewer and to a right angle telescopic support 224 fixed to the back of a chair indicated at 226. In this arrangement, turn of the viewer's head adjusts the potentiometer 208 about a vertical axis indicated by the dash-dot line 228 and tilt of the viewer's head adjusts the potentiometer 210 about an axis indicated by the cross lines 230.

Referring now to FIG. 4, there is shown details of the circuit 212 and the connections thereto. As shown in FIG. 4, the circuitry includes two individual circuits each comprising a bistable flipflop, utilized as a delay means, a transistor and a capacitor, utilized as a triggering circuit for the flipflop, and a one shot multivibrator for producing a pulse of limited time duration. The two individual circuits are coupled to a common AND gate to provide the gate signal for actuating the electronic switch 64. Considering the two individual circuits in detail, one circuit includes a flip-flop 232, multivibrator 234, NPN transistor 236, and charging capacitor 238. Horizontal sync input to the flipflop 232 is provided on input line 218. When flipflop 232 is in "on" condition its output is passed on a line 240 to the multivibrator 234 and thence on a line 242 as one input to an AND gate 244. The second output of the flipflop 236 is passed on a line 246 to the collector 248 of transistor 236 and thence through the emitter 250 and lines 252 and 254 to one side of charging capacitor 238, the other side of which is connected to ground (indicated) by a line 258. The base 260 of transistor 236 is connected by a line 262 to the potentiometer 208. The charging side of capacitor 238 is connected back to the flipflop 232 by a line 264 to reverse the condition of flipflop 232 when capacitor 238 reaches a specific charge and thereby provides an output on line 240 to the multivibrator 234 and a gate signal to the AND gate 244. The setting of the potentiometer 208 determines the resistance value of the transistor 236 and hence the charging time for the capacitor 238. The output on line 240 is a pulse (indicated) which actuates the one shot multivibrator 234 which in turn provides a gate pulse (indicated) to the AND gate 244. The time duration of the gate pulse depends upon the setting of the multivibrator 234 and therefore can be adjusted to vary the size of video "on" pattern developed.

The other individual circuit providing also a gate pulse to the AND gate 244 comprises the same group of elements, i.e., a flipflop 266, one shot multivibrator 268, transistor 270, charging capacitor 272, and the associated potentiometer 210. The circuit is connected and operates as described in detail for the one individual circuit. To simplify the specification and avoid redundant description, numbering and description of the various connecting lines is omitted. It should suffice to note that this other individual circuit receives its inputs from a vertical sync on line 220 (corresponding to FIG. 3) and from the associated potentiometer 210. When the output gate signals of the two circuits are applied to the AND gate, the necessary output signal is obtained on the AND gate output line 88 and applied to actuate the electronic switch 64 (FIG. 3) to "on" condition thereby actuating the automatic focus system for the limited area of interest of the raster scan.

Figure 5:
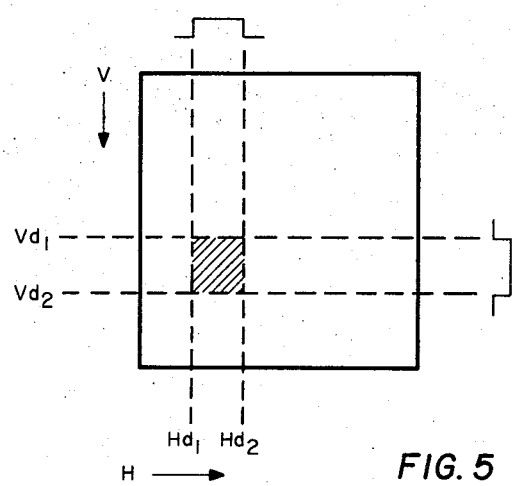
FIG. 5 is a diagrammatic view of a T.V. raster provided to explain the operation of the sensor system of the apparatus of FIG. 3.

The above is further exemplified and explained by FIG. 5. As shown in FIG. 5, the horizontal scan gate is represented by the dotted lines Hd1 and Hd2. During this period of scan the AND gate 244 is receiving a gate signal from the horizontal sync individual circuit. The vertical scan gate is represented by the dotted lines Vd1 and Vd2. During this period of scan the AND gate 244 is receiving a gate signal from the vertical sync individual circuit. The shaded area in FIG. 5 defined by coincidence of horizontal and vertical gate signals develops the area of interest which in turn has been developed through the potentiometers 208 and 210 by adjustment thereof by movement of the head of the viewer in turn and tilt action as the screen is viewed.

In conclusion, the subject invention provides the advantage of automatic focus limited to best focus for a limited area of the overall image to which the attention of the viewer is directed and which has been termed the area of interest. As the viewer changes head position in turn for viewing different horizontal portions of the screen 72 and/or tilt for viewing different vertical portions of the screen, the system automatically provides best focus for that limited area to which the viewer's attention is directed. The viewer may purposely change the attitude of his head to cause best focus for various portions of the scene.

What is claimed is:

1. In a closed circuit T.V. system including a T.V. camera having a source of horizontal and vertical sync signals and lens means for focusing on a scene and producing output electrical signals representative of said scene and monitor means including a monitor screen and projector, the projector being connected to the camera for reproducing the scene responsive to the camera output electrical signals, apparatus for automatically focusing said camera on a limited area of interest of said scene dependent upon the head movements of a person viewing the scene reproduced on said monitor comprising in combination
    a. servo motor means connected to actuate the lens system of T.V. camera for focusing the same,
    b. an automatic focusing circuit including a discriminator, sample, hold and delay, comparator and search sequencer circuits together with a timer for automatically focusing said lens system responsive to output electrical signals from said T.V. camera,
    c. a normally open electronic switch means connected in series between said T.V. camera output and said focusing circuit to inhibit focusing condition indicator signals when said switch is in "off" position, and
    d. gate signal triggering means for actuating said electronic switch means to "on" condition responsive to the turn and tilt position of the head of the viewer and to the horizontal and vertical sync signals of said camera comprising a head piece attached to the viewer's head and an electrical gate circuit means connected to said head piece and to the horizontal and vertical sync signal source of said camera and having an output connected to pass a gate signal to said electronic switch means to actuate said switch means to "on" condition for a limited portion of the video output of said camera corresponding to the area of interest as determined by the turn-tilt attitude of the viewer's head.

2. Apparatus according to claim 1, said gate signal triggering means comprising
    a. a second screen,
    b. light ray source means connected to said head piece to project a limited area pattern on said second screen,
    c. a second camera positioned to monitor said second screen, said camera being connected to said first camera by horizontal and vertical sync lines to provide coordinated scan of the two cameras, d. said second camera having an output video line connected to said switch means to gate said switch to "on" condition as said light pattern on said second screen is scanned by said second camera whereby movement of the viewing head in turn and/or tilt to view an area of interest on said monitor screen varies the position of the light pattern on said second screen to cause said switch means to pass video signals to said focusing circuit only for the area of interest for which the viewer's head is adjusted in attitude.

3. Apparatus according to claim 2,
 a. said second screen being translucent and said light source and second camera being positioned on opposite sides of said second screen, and
 b. said second camera having an inverted lens.

4. Apparatus according to claim 2,
 a. said light source and said second camera being positioned on the same side of said second screen.

5. Apparatus according to claim 2,
 a. said second screen being translucent and said light source and second camera being positioned on opposite sides of said second screen, and
 b. said second camera being mounted in inverted position.

6. Apparatus according to claim 1, said gate signal triggering means including
 a. a fixed support,
 b. a pair of potentiometers fixed to said support and to said head piece in slidable and rotatable manner for adjustment of said potentiometers respectively by turn and tilt of the viewing head,
 c. an electronic circuit including two individual gate circuits connected to a common AND gate circuit, the output of which is connected to said electronic switch,
 d. each of said individual circuits including a delay means, a one shot multivibrator and a trigger circuit means,
 e. the delay means of one of said gate circuits being connected to said horizontal sync source and the trigger circuit means being connected to said turn potentiometer to provide said AND gate with a pulse corresponding to turn potentiometer adjustment,
 f. the delay means of the other of said gate circuits being connected to said vertical sync source and its trigger circuit means being connected to said tilt potentiometer to provide said AND gate with a pulse corresponding to tilt potentiometer adjustment 7. Apparatus according to claim 6,
 a. each of said delay means comprising a flipflop circuit,
 b. said trigger circuit means each comprising a transistor and charging capacitor connected in series between its associated flipflop circuit and ground with a feedback to one input of said flipflop from the charging side of the charging capacitor.

* * * * *